United States Patent
Zouhri et al.

(10) Patent No.: US 11,455,324 B2
(45) Date of Patent: Sep. 27, 2022

(54) METHOD FOR DETERMINING RELEVANT SEARCH RESULTS

(71) Applicant: SETTLE SMART LTD., Edmonton (CA)

(72) Inventors: Youssef Zouhri, Sturgeon County (CA); Chris Trudel, Edmonton (CA); Ryan Thomas Bencic, St. Albert (CA); Daisy Amador, Edmonton (CA)

(73) Assignee: Settle Smart Ltd., Edmonton (CA)

( * ) Notice: Subject to any disclaimer, the term of this patent is extended or adjusted under 35 U.S.C. 154(b) by 0 days.

(21) Appl. No.: 17/079,069

(22) Filed: Oct. 23, 2020

(65) Prior Publication Data

US 2022/0129492 A1    Apr. 28, 2022

(51) Int. Cl.
| | |
|---|---|
| *G06F 16/30* | (2019.01) |
| *G06F 16/332* | (2019.01) |
| *G06F 16/338* | (2019.01) |
| *G06Q 50/18* | (2012.01) |
| *G06F 16/33* | (2019.01) |
| *G06F 16/38* | (2019.01) |

(52) U.S. Cl.
CPC ........ *G06F 16/3323* (2019.01); *G06F 16/338* (2019.01); *G06F 16/3326* (2019.01); *G06F 16/3334* (2019.01); *G06F 16/382* (2019.01); *G06Q 50/18* (2013.01)

(58) Field of Classification Search
CPC ............... G06F 16/382; G06F 16/3323; G06F 16/3334; G06F 16/3326; G06F 16/338; G06Q 50/01
See application file for complete search history.

(56) References Cited

U.S. PATENT DOCUMENTS

| | | | |
|---|---|---|---|
| 5,544,352 A | 8/1996 | Egger | |
| 6,192,360 B1 | 2/2001 | Dumais et al. | |
| 6,289,342 B1* | 9/2001 | Lawrence | G06F 16/951 |
| 6,415,294 B1* | 7/2002 | Niemi | G06F 16/9558 |
| | | | 707/999.102 |
| 6,502,081 B1 | 12/2002 | Wiltshire, Jr. et al. | |
| 6,772,149 B1 | 8/2004 | Morelock et al. | |
| 7,606,757 B1 | 10/2009 | Poltorak | |
| 7,797,336 B2 | 9/2010 | Blair et al. | |
| 7,912,842 B1 | 3/2011 | Bayliss | |
| 10,095,778 B2 | 10/2018 | Barney | |
| 11,170,375 B1* | 11/2021 | Kramme | G06N 20/00 |

(Continued)

OTHER PUBLICATIONS

Article entitled "Deep Semantic Interpretations of Legal Texts", by McCarty, dated Jun. 4, 2007 (Year: 2007).*

(Continued)

*Primary Examiner* — Mahesh H Dwivedi
(74) *Attorney, Agent, or Firm* — Finch & Maloney PLLC; Jay S. Franklin; Michael J. Bujold

(57) ABSTRACT

A method for determining relevant search results includes provided a searchable database containing a plurality of source documents with corresponding citations. The source documents and the corresponding citations have keywords. The keywords are extracted from the source documents and citations using a parser and are stored in the searchable database in association with the source documents and citations. The citations are linked to their source documents in a graph databased based upon the keywords shared between them.

17 Claims, 5 Drawing Sheets

(56) References Cited

U.S. PATENT DOCUMENTS

| | | | |
|---|---|---|---|
| 2002/0035488 A1* | 3/2002 | Aquila | G06Q 40/08 |
| | | | 705/4 |
| 2002/0156760 A1* | 10/2002 | Lawrence | G06F 16/951 |
| 2007/0136281 A1 | 6/2007 | Li et al. | |
| 2008/0282187 A1* | 11/2008 | Buschman | G06F 16/957 |
| | | | 715/784 |
| 2010/0332520 A1 | 12/2010 | Lu et al. | |
| 2011/0191335 A1 | 8/2011 | Miller et al. | |
| 2011/0191345 A1* | 8/2011 | Young | G06F 16/355 |
| | | | 707/739 |
| 2011/0219017 A1* | 9/2011 | Cui | G06F 16/00 |
| | | | 707/769 |
| 2012/0076413 A1* | 3/2012 | Ferman | G06K 9/00469 |
| | | | 382/176 |
| 2012/0233152 A1* | 9/2012 | Vanderwende | G06F 16/382 |
| | | | 707/722 |
| 2013/0191294 A1 | 7/2013 | Lee | |
| 2015/0317320 A1* | 11/2015 | Miller | G06F 16/90324 |
| | | | 707/728 |
| 2016/0342591 A1* | 11/2016 | Zholudev | H04L 67/1044 |

OTHER PUBLICATIONS

Article entitled "High-Quality Capture of Documents on a Cluttered Tabletop with a 4K Video Camera", by Kim et al., dated Sep. 11, 2015 (Year: 2015).*

* cited by examiner

FIGURE 3

| document | |
|---|---|
| documentId | 11234 |
| clusterDocumentCount | 22 |
| clusterMentionTotal | 1071 |

| document | |
|---|---|
| documentId | 11235 |
| clusterDocumentCount | 9 |
| clusterMentionTotal | 679 |

| document | |
|---|---|
| documentId | 11236 |
| clusterDocumentCount | 14 |
| clusterMentionTotal | 758 |

| keyword | |
|---|---|
| keyword | foot |
| avgMentionsPerDocument | 0.120 |

| keyword | |
|---|---|
| keyword | ankle |
| avgMentionsPerDocument | 0.084 |

| keyword | |
|---|---|
| keyword | knee |
| avgMentionsPerDocument | 0.230 |

| keyword | |
|---|---|
| keyword | leg |
| avgMentionsPerDocument | 1.872 |

| document-keyword | |
|---|---|
| keyword | foot |
| documentId | 11234 |
| clusterMentionCount | 429 |
| aboutScore | 0.398 |

| document-keyword | |
|---|---|
| keyword | ankle |
| documentId | 11234 |
| clusterMentionCount | 223 |
| aboutScore | 0.216 |

| document-keyword | |
|---|---|
| keyword | knee |
| documentId | 11234 |
| clusterMentionCount | 57 |
| aboutScore | 0.048 |

| document-keyword | |
|---|---|
| keyword | leg |
| documentId | 11234 |
| clusterMentionCount | 382 |
| aboutScore | 0.380 |

| document-keyword | |
|---|---|
| keyword | foot |
| documentId | 11235 |
| clusterMentionCount | 287 |
| aboutScore | 0.421 |

| document-keyword | |
|---|---|
| keyword | ankle |
| documentId | 11235 |
| clusterMentionCount | 122 |
| aboutScore | 0.179 |

| document-keyword | |
|---|---|
| keyword | knee |
| documentId | 11235 |
| clusterMentionCount | 187 |
| aboutScore | 0.279 |

| document-keyword | |
|---|---|
| keyword | leg |
| documentId | 11235 |
| clusterMentionCount | 83 |
| aboutScore | 0.097 |

| document-keyword | |
|---|---|
| keyword | foot |
| documentId | 11236 |
| clusterMentionCount | 184 |
| aboutScore | 0.241 |

| document-keyword | |
|---|---|
| keyword | ankle |
| documentId | 11236 |
| clusterMentionCount | 343 |
| aboutScore | 0.451 |

| document-keyword | |
|---|---|
| keyword | knee |
| documentId | 11236 |
| clusterMentionCount | 57 |
| aboutScore | 0.074 |

| document-keyword | |
|---|---|
| keyword | leg |
| documentId | 11236 |
| clusterMentionCount | 174 |
| aboutScore | 0.195 | aboutScore = ((clusterMentionCount/clusterDocumentCount)/avgMentionsPerDocument)·avgMentionsPerDocument/(clusterDocumentCount·clusterMentionTotal))

METHOD FOR DETERMINING RELEVANT SEARCH RESULTS

FIELD OF THE DISCLOSURE

The present application relates generally to a method for determining relevant search results, and more particularly relates to a method of linking relevant case law for researching purposes.

BACKGROUND

This section provides background information to facilitate a better understanding of the various aspects of the invention. It should be understood that the statements in this section of this document are to be read in this light, and not as admissions of prior art.

Searchable databases are used in many different industries and for many different purposes. It is common to utilize keywords and Boolean searches in relation to a database to find information relevant to a search, however there is a tendency for these types of searches to result in a large number of results with little to no relevancy to the searcher's query. The databases that use these types of searches to determine relevancy often utilize excessive computing power when identifying results due to the large number of non-relevant results included in the results.

BRIEF SUMMARY

There is provided a method for determining relevant search results that includes providing a searchable database containing a plurality of source documents. The source documents have at least one keyword. At least one citation corresponds to each of the source documents. The at least one keywords are extracted from one of the source documents using a parser. The at least one keywords are stored in the searchable database in association with the one source document. The at least one citations corresponding to the one source document are parsed to identify at least one keyword for each of the at least one citations. The at least one citations are linked to the one source document in a graph database based upon the at least one keywords shared between the one source document and the at least one corresponding citations. The process of extracting keywords from one of the plurality of source documents, parsing the at least one corresponding citations and linking the at least one corresponding citations to the one source document in a graph dataset is repeated until all of the plurality of source documents are linked and to at least one corresponding citation to create a web of interaction between the plurality of source documents.

In one embodiment an is about score is calculated. The is about score quantifies the number of keywords that are shared between the one source document and the at least one corresponding citations.

In one embodiment, the is about score is used to rank the plurality of source documents and the at least one corresponding citations for searching purposes.

In one embodiment, a potential judgement value is predicted by plotting a dollar value for a judgement for a set of the most relevant source documents and the at least one corresponding citation on a bell curve, the set of the most relevant source documents being determined by the relevance score. The potential judgement value may be determined by the largest dollar value for a judgement found in the set of the most relevant source documents.

In one embodiment, the at least one keyword is a subset of a type of law.

In one embodiment, the at least one keywords include a specific jurisdiction.

In one embodiment, the at least one keywords include an identification of which party or parties are at fault and to what degree each of the parties are at fault.

In one embodiment, the at least one keyword includes personal injury law. The at least one keywords may include the severity of the injuries on an injured party. The severity of the injuries can be used as a calculated weighting.

In one embodiment, a further step of calculating a total claims value is calculated by adding the potential judgement value with an estimated cost for litigation to create a sum total and multiplying the sum total by an interest value to create the total claims value.

In one embodiment, a further step of adjusting the total claims value to a current day value is completed by calculating the present value of the total claims value using one or more methods known in the art. Such methods may include calculating the present value as (future value)/(1+ (the periodic rate of return))^(number of periods).

In one embodiment, a further step of creating probability maps of at least one common occurrence in the plurality of source documents and corresponding citations is completed to analyze for a potential deviancy related to an uncommon occurrence.

In one embodiment, a further step of creating a probability map related to at least one of the keywords is completed to analyze for a potential outcome.

In one embodiment, the at least one corresponding citation is attributed to a specific party providing the corresponding citation when the source document is being parsed.

In one embodiment, a set of document results of a keyword query search are provided to a user based upon a relevance score. The relevance score quantifying a matching between the at least one keywords of the plurality of source documents and the keyword query search. The set of document results of the keyword query search includes only the source documents where the is about score is greater than zero.

In one embodiment, the relevance score is calculated using the formula ((sum of is about score of matching keyword mentions where is about score>0)/((sum of is about score of matching keyword mentions where is about score>0)+(sum of is about score of not matching keyword mentions where is about score>0)))×(sum of query weight of matching keyword mentions where is about score>0).

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

FIG. 3 is a table related to the calculation of is about scores.

DETAILED DESCRIPTION OF THE PREFERRED EMBODIMENTS

A method for determining relevant search results will now be described with reference to FIG. 1 through FIG. 5.

A method for determining relevant search results utilizes a searchable database that contains a plurality of source documents such as case law, scholarly articles related to case law, scholarly articles related to other topics, insurance cases, insurance claim files, books, literature, music, patents, patent applications, websites, webpages with links, and other documents with referential linking or citations. Source documents have keywords associated with them. Keywords are the words that have some meaning within source documents and may be searchable using keyword and Boolean searches. These include single words, phrases, and themes. A theme is a specific type of keyword that generally indicates broader topics for which source documents relate such as types of law (personal injury, constitution, and employment as examples only) and jurisdictions. A person of skill will understand that keywords may vary and can encompass a large range of words, phrases and topics. At least one citation corresponds to each of the source documents within searchable database. It will be understood by a person skilled in the art that citation may also be a source document with at least one citation. In being both a source document and a citation, it becomes a part of a web of interacting source documents. When interacting with searchable database, a user chooses keywords to be queried and search results are determined based upon those keywords.

Figure 1:
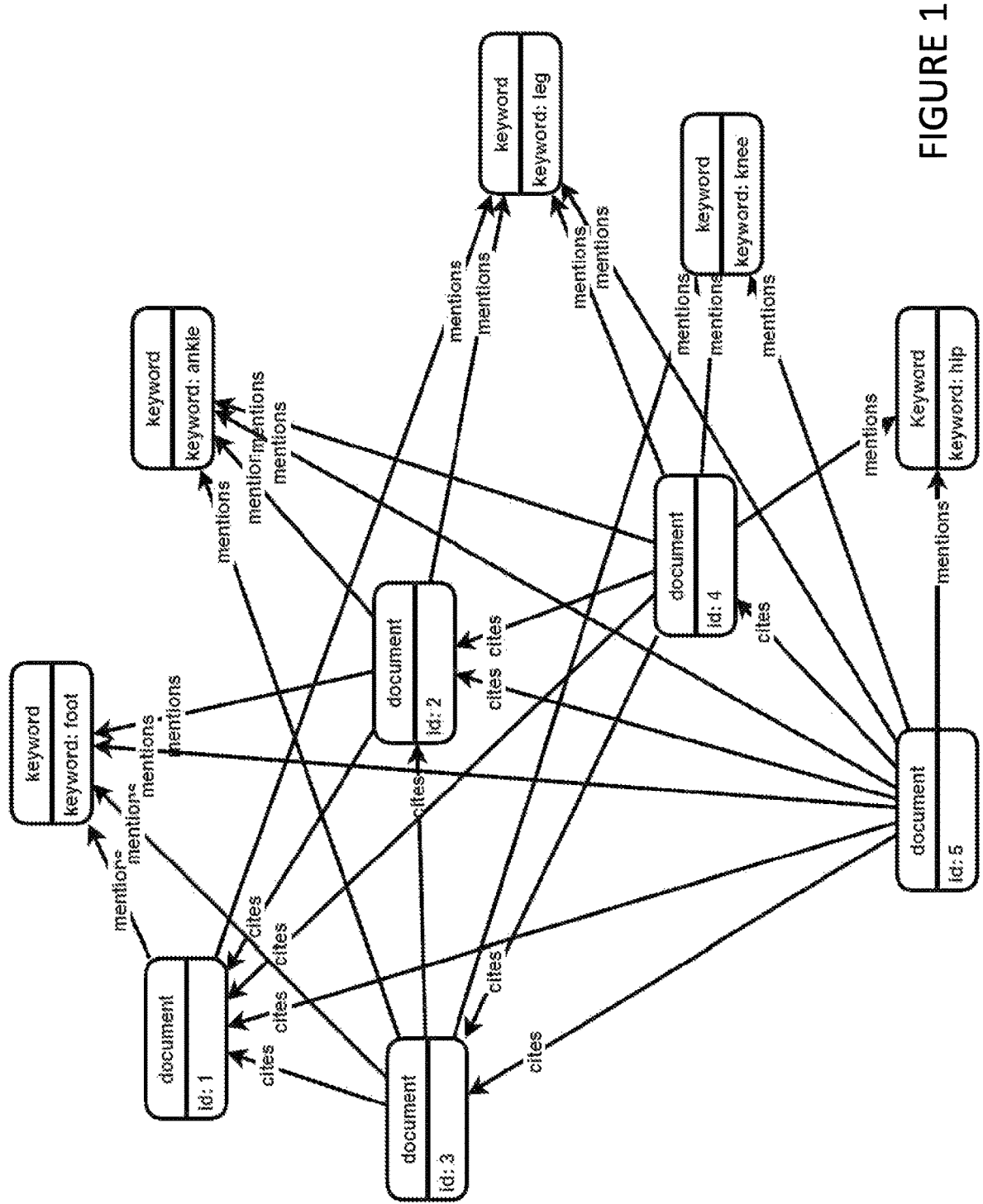
FIG. 1 is a graphical representation of a graph database.

Keywords are extracted from one of source documents using a parser. Keywords provide an idea of what a source document may be about. It will be understood by a person skilled in the art that any parser may be used, including but not limited to python based tokenizers, artificial intelligent software, neural nets, deep learning, machine learning parsers, IBM Watson, Amazon Comprehend, AYLIEN, TextRazor, parsers that incorporate a lexer, scanner, or tokenizer or custom built keyword extraction software. Keywords are stored in searchable database in association with the source document to which they relate to allow for these keywords to be used as identifiers during a search of searchable database. Citations have keywords associated with them. Keywords are extracted from citations using a parser. Keywords are stored in searchable database in association with the citation to which they relate. Citations can then be linked to their source documents in a graph database based upon the keywords that are shared between the source document and the corresponding citation. Referring to FIG. 1, graph database has document nodes, keyword nodes, document-to-document citation relationships and document to keyword mentions relationships that are used to group documents and determine relatedness. Each group is described by its relationships. Each document has its own group of relationships and each document is also present in many other groups. The more relationships shared between two source documents on graph database, the more related to each other they are.

When using a parser to extract keywords from corresponding citations, the parser is capable of attributing the corresponding citation to a specific party. In the example of case law, a corresponding citation can be attributed to either the plaintiff's counsel or to the defendant's counsel depending upon which party provided the citation. The parser may determine citation attributions through various methods including, but not limited to, creating a word cloud, using natural language processors (NLPs), performing a Latent Dirichlet Allocation (LDA) theme analysis, or any number of other language or keyword parsing techniques known to a person skilled in the art.

In one embodiment of the present invention, in addition to parsing the source documents, specific information may be isolated and extracted from section titles, paragraphs, and other specific areas common to certain document types. For example, where the source document is a case law documents such information may include plaintiff information, defendant information, and compensation award amounts. This type of information may be linked to specific keywords such that when a linking search query is made, source documents lacking this linkage may be omitted from search results. As an example, a link may be made between a plaintiff's age and injuries received in an accident. If a search query is made with a link between age and injury, source documents with this linkage are likely to have a higher relevance score than source documents lacking this linkage. Relevance score relates to the matching of keywords from a keyword query search performed by a user with keywords within source documents. A set of document results of a keyword query search are provided to a user based upon the relevance score. The set of document results of the keyword query search include only source documents where the is about score is greater than zero.

In addition to these steps, a data cleaning and noise reduction step may be completed. Using python scripts, which are known to persons skilled in the art, it is possible to identify which paragraphs of source documents can be attributed to specific individuals. As an example, when source document is case law, it is possible to identify which paragraphs are spoken by the judge, the plaintiff's counsel and the defendant's counsel using python scripts. If the defendant is successful in defending against the claim made against them, their counsel's arguments may be determined to be more relevant than the corresponding arguments made by plaintiff's counsel that failed. Paragraphs related to plaintiff's counsel may be removed from consideration when determining relevance score. Using Natural language processing scripts, known to persons skilled in the art, it is possible to determine noisy keywords from sentence structure. As an example, "my back hurts" and "get back at me" would be identified differently and depending upon other keywords and paragraphs within a source document, one or both could be removed. A predetermined keyword count threshold may also be used during data cleaning and noise reduction. By requiring a keyword to appear at or above a predetermined threshold count, extraneous mentions of a keyword is less likely to bias the system. For example, it is unlikely that a document will be about an ankle injury when a document has only a single mention of the word ankle. On the other hand, a document with several mentions of the word ankle may actually be about an ankle injury. A predetermined threshold count may be determined by the searchable database operator and may vary from no value to any value deemed suitable by a person skilled in the art. A predetermined threshold count of two may be useful in some circumstances.

Figure 2:
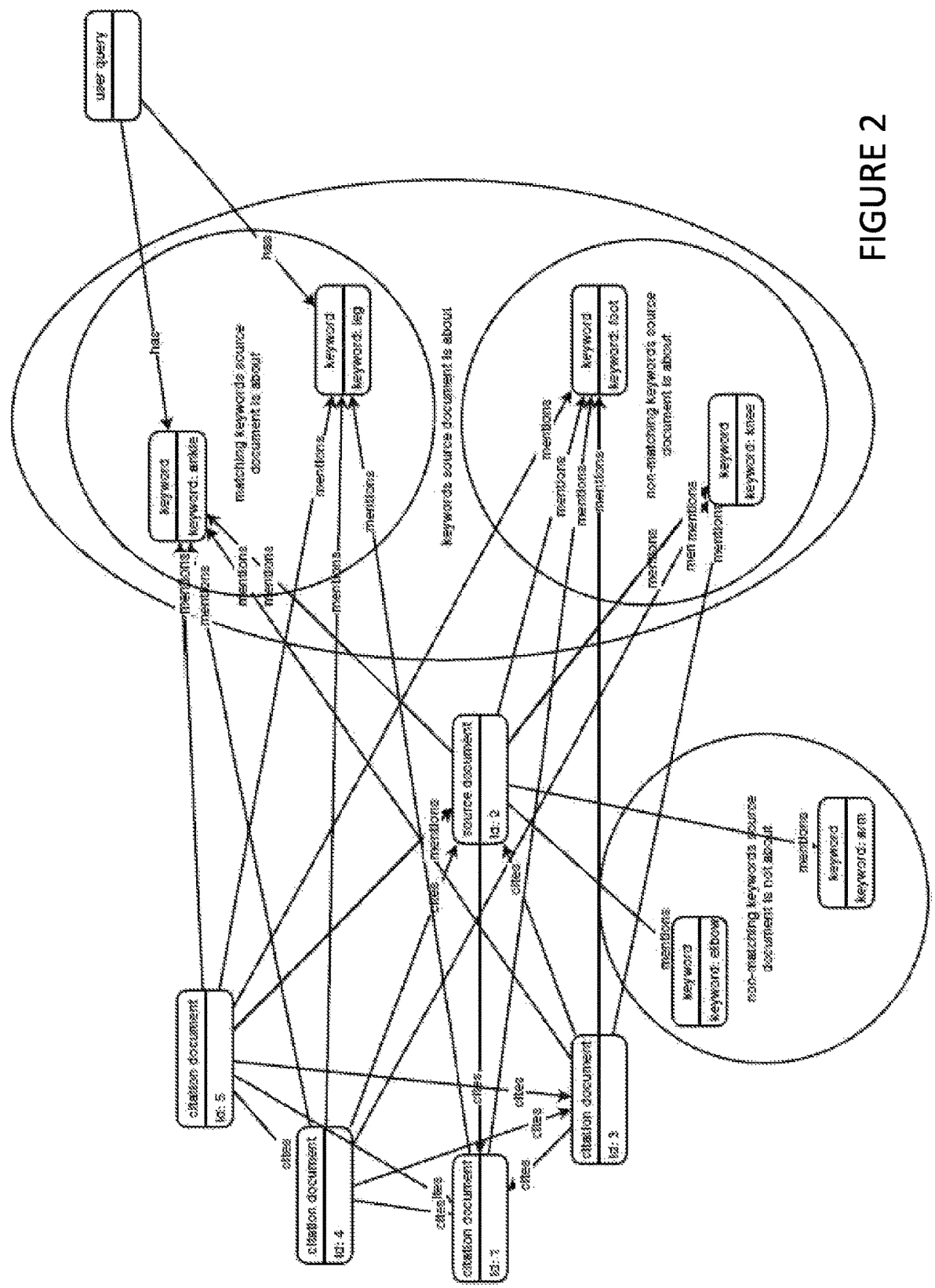
FIG. 2 is a graphical representation of a Venn diagram.

In one embodiment, graph database is based upon an is about score that quantifies the number of keywords that are shared between source document and a corresponding citation. The is about score can be used to group source documents and corresponding citations on graph database. The is about score provides insight into what a source document is actually about as it relates to the overlap of keywords between source document and corresponding citations. Referring to FIG. 2, for further clarification, the is about score is similar to what one might see in an overlapping portion of a Venn diagram. Shared keywords between source document and corresponding citations are found within the overlap and relate to the is about score, while keywords that are not shared between source document and corresponding citations are found in the non-overlapping portion of the circles.

As an example only, a source document may relate to a personal injury lawsuit where the injuries sustained to the plaintiff in a car crash included a traumatic spinal injury causing paraplegia, a broken arm and minor cuts and bruises to the face. The keywords "car crash", "traumatic spinal injury causing paraplegia", "broken arm", "minor cuts and bruises" and "personal injury" indicate what source document is likely about. A first corresponding citation A relates to a personal injury lawsuit where the injuries sustained to the plaintiff after being attacked include a traumatic spinal injury causing paraplegia and a sprained wrist. A second corresponding citation B relates to a personal injury lawsuit where the injuries sustained to the plaintiff from slipping on ice include a traumatic spinal injury causing paraplegia and minor cuts and bruises. The shared keywords of source document and citations A and B include relation to a personal injury lawsuit and a plaintiff with paraplegia. This tells us that source document is actually about a personal injury lawsuit and a plaintiff with paraplegia. Being able to determine what a source document is actually about can be useful to a searcher in that it can remove from the search documents that are not about the issue being searched and it also has the ability to reduce the computing power needed to complete the search.

Graph database is populated using a variety of computed statistics. For each keyword, a ratio of all mentions, a keyword average of mentions per document and a ratio of all documents are calculated as follows:

Ratio of all mentions=(sum of occurrences of a specific keyword mentions in all documents)/(sum of all occurrences of all keywords mentioned in all documents), as an example where the keyword is sprain, the ratio of all mentions is equal to the number of times sprain is used within all documents in searchable database divided by the number of all keywords found within all documents in searchable database;

Keyword average of mentions per document=(sum of occurrences of the specific keyword mentions in all documents)/(count of all documents in entire searchable database), as an example where the keyword is sprain, the keyword average of mentions per document is equal to the number of times sprain is found within all documents in searchable database divided by the number of documents in the searchable database;

Ratio of all documents=(count of documents that mention keyword)/(count of all documents).

For each document, a document citation cluster count is calculated. A document's citation cluster contains the document itself and all of the documents that cite or are cited by the document. A document citation cluster count is calculated as follows:

Document citation cluster count=1+(count of other documents that cite the document)+(count of corresponding citations of the source document).

For each relationship between each document and each keyword, a citation cluster keyword mention count, a citation cluster mentions per document, a citation cluster mentions per document average difference, and a citation cluster mentions per document average ratio are calculated. As can be seen in FIG. 3, these values are calculated for each of the "mention" lines provided. The citation cluster keyword mention count, the citation cluster mentions per document, the citation cluster mentions per document average difference, and the citation cluster mentions per document average ratio are calculated as follows:

Citation cluster keyword mention count=(count keyword occurrences in the document)+(count keyword occurrences in other documents cited by the document)+(count keyword occurrences in other documents that cite the document), as an example where the keyword is sprain, the citation cluster keyword mention count equals the number of times sprain is used in a source document plus the number of times sprain is used in documents that cite the source document plus the number of times sprain is used in corresponding citations;

Citation cluster mentions per document=(citation cluster keyword mention count)/(document citation cluster count);

Citation cluster mentions per document average difference=(citations cluster mentions per document)−(keyword average mentions per document);

Citation cluster mentions per document average ratio=(citations cluster mentions per document)/(keyword average of mentions per document).

For each document, a citation cluster mention total is calculated as follows:

Citation cluster mention total=(sum of citation cluster keyword mention count for each keyword mentions in the document), as an example where the keywords are sprain, broken femur and concussion, the citation cluster mention total is equal to the number of times sprain is used in the cluster plus the number of times broken femur is used in the cluster plus the number of times concussion is used in the cluster.

For each relationship between each document and each keyword, a citation cluster mention weight and an is about score are calculated. As can be seen in FIG. 3, these values are calculated for each of the "mention" lines provided. These values may be calculated for each of the keywords mentioned in each document. The is about score uses a combination of the ratio of the sum of how many times a keyword is mentioned in the document's citation cluster over the sum of how many times all of the document's mentioned keywords are mentioned in the document's citation cluster, and a ration of the average number of times the keyword is mentioned per document in the document's citation cluster over the average number of times the keyword is mentioned per document in the entire searchable database. The citation cluster mention weight and the is about score are calculated as follows:

Citation cluster mention weight=(citation cluster keyword mention count)/(document citation cluster mention total);

Is about score=(citation cluster mention weight)×(citation cluster mentions per document average difference)/(citation cluster mentions per document), the is about score can be a positive or a negative number.

The is about score is contextual to the relationships between each document and each keyword, or mention lines shown in FIG. 3. It will be understood by a person skilled in the art that different calculations may be made to achieve an is about score.

Relevance score can be calculated by ranking relevant documents to document-by-keyword search and by ranking relevant keywords to a keyword search. For each document result, a matching query weight, a total matching about score, a total not matching about score, a document score and a weighted score are calculated. When calculated the relevance score, a query input from the user using keywords, along with their relative search weight, or importance, to each other is used. As an example only and in relation to personal injury, relative search weight, or importance, is determined by the user based on injury severity with the more severe injuries carrying a higher search weight. Information regarding relative search weight may be provided through the user manually ranking user keywords, providing a numbers rating (1-10 as an example only) for each user keyword, through the use of sliders to indicate severity being associated with keywords, or by any other method for weighting known to a person skilled in the art. In general use, the importance of keywords is determined by a user when entering a query request into the searchable database. The matching query weight, the total matching about score, the total not matching about score, the document score and the weighted score are calculated as follows:

Matching query weight=(sum of query weight of matching keyword mentions where is about score>0), where query weight of matching keyword mentions is the weighting of keywords that are placed into the system as part of a query by a user. As an example where a user creates a query for sprain, concussion and femur, the user ranks each injury for severity on a scale of 1 to 5, with 1 being a short-lived injury with no real lifestyle impact and 5 being a permanent and severe lifestyle impact. The user ranks the sprain as 1, concussion as 3, and broken femur as 4. This provides a total impact score of 8 (1+3+4). The relative query weighting of the sprain is ⅛, the concussion is ⅜ and the broken femur is ⅘. The weightings tell us that a returned source document that is purely about a sprain is less relevant than a document that is purely about a broken femur and allow documents to be found that are more about the total matching weight vs unmatching weight;

Total matching is about score=(sum of is about score of matching keyword mentions where is about score>0), as an example, where a query search includes sprain, broken femur and concussion, the sum of the is about scores for each of sprain, broken femur and concussion is the total matching is about score;

Total not matching about score=(sum of is about score of not-matching keyword mentions where is about score>0), a not matching score is used to determine how much of a document is about other keywords not mentioned in a search query by a user. In other words, it is a measure of how much the document is about something outside the search query made by the user. As an example where a query search includes sprain, broken femur and concussion but the document also is determined to be about broken finger, bruised knee and broken tooth, the total not matching about score is equal to the sum of the is about scores of broken finger, bruised knee and broken tooth;

Document score=(total matching about score)/((total matching is about score)+(total not matching is about score));

Relevance score=(document score)×(matching query weight).

For each keyword result, matching documents count, matching keyword document count, average mentions per matching document and keyword score are calculated as follows:

Matching documents count=(count of documents having keywords matching query with an is about score>0);

Matching keyword document count=(count of documents having keywords matching query with an is about score>0 and mention the result keyword with an is about score>0);

Average mentions per matching document=(sum of occurrences of result keyword mentions in documents having keywords matching query with an is about score>0)/(matching documents count);

Keyword score=(average mentions per matching document)−(keyword average mentions per document), where keyword average mentions per document is calculated by dividing the total number of times that a single keyword is present in the searchable database by the number of documents in the searchable database. In a simplified example, the term knee appears in 50 times in a searchable database with 5 documents. The keyword average mentions per document for the term knee would be 10.

The keyword score is used to assist users with query searches. Keyword score is used to auto-complete query searches. When a user searches for certain keywords, keywords that have not been searched for but that may be relevant will have a high keyword score. For example, if skull fracture is part of the query, then brain injury may have a high keyword score and may show up an auto-complete for the search.

The keyword averages may also be calculated for each cluster of source documents and corresponding citations. This is calculated by adding the total number of times a keyword was found within a clustered group of related source documents and corresponding citations and dividing that value by the total number of related source documents and corresponding citations within the group. This provides a cluster average of keywords. The keyword cluster average can be compared to the keyword average mentions per document to determine if the cluster average is higher or lower than the baseline average.

The process of extracting keywords from source documents, extracting keywords from corresponding citations, and linking the corresponding citations to source document in a graph database based upon the keywords that are shared between the source document and the corresponding citation are repeated until all of the plurality of source documents have been assessed. Each of the plurality of source documents and corresponding citations are linked to each other based upon keywords shared between source documents and corresponding citations. As can be seen in FIG. 1, this creates a web of interacting data with each intersection in the web relating to a specific source document. The closer a source document is to another source document on the web, the more likely that they are to relate to each other in some way.

Figure 4:
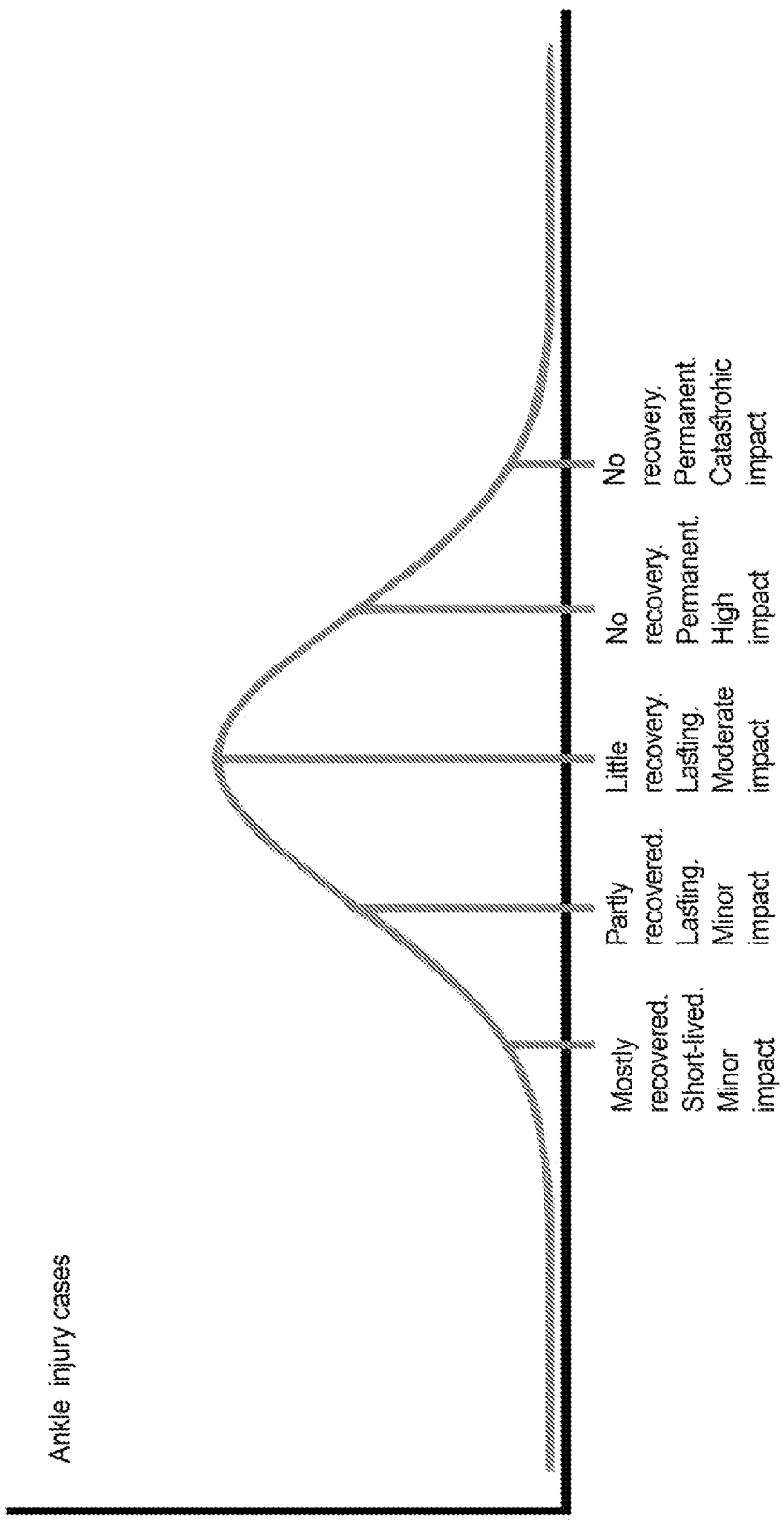
FIG. 4 is a graphical representation of a bell curve of a potential judgement value.
Figure 5:
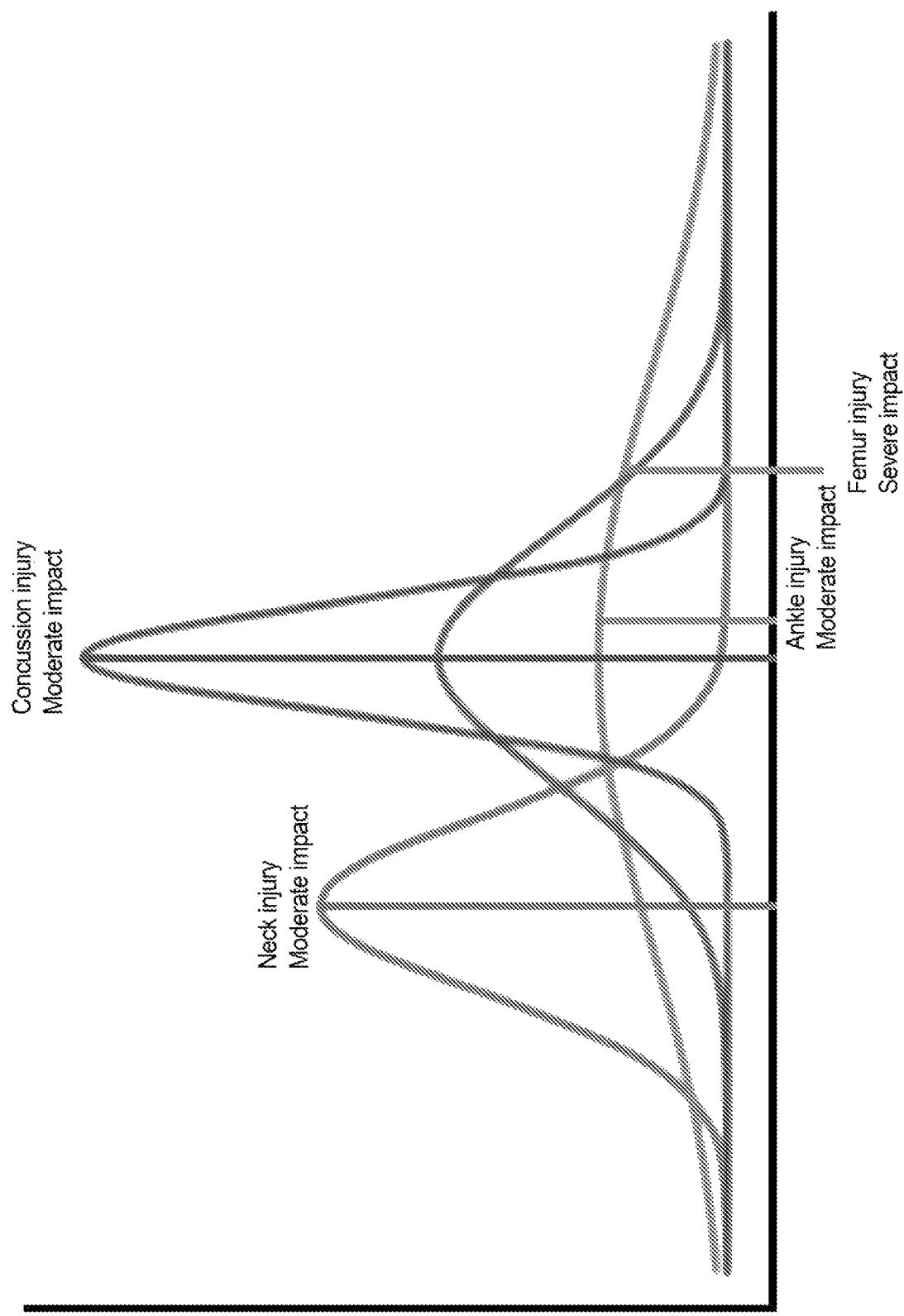
FIG. 5 is a graphical representation of determining a potential judgement value where multiple keywords relate to different potential judgement values.

Referring to FIG. 4, a potential judgement value may be predicted by plotting a dollar value for a judgement for a set of the most relevant source documents and corresponding citations on a bell curve. The set of the most relevant source documents is determined by the relevance score. In the embodiment shown, bell curve has an x axis related to a dollar value and a y axis related to the number of source documents used in creating the curve. The bell curve is divided into quantiles to identify the severity of injuries. In this example, the injury quantiles relate to: mostly recovered, short lived and minor impact (5%), partially recovered, lasting but not severe impact (25%), little to no recovery, lasting with moderate impact (50%), no recovery, permanent with high impact (75%), and no recovery, permanent with catastrophic impact (95%). The potential judgement value would be predicted by the x value at point on the bell curve where the y value meets the curve. When a number of different values for different injuries or issues is available, the potential judgement value is generally based on the concept of the highest low. As an example only and referring to FIG. 5, a plaintiff may have a neck injury with moderate impact that sits in the 50% quantile on a bell curve, a concussion injury with moderate impact that sits in the 50% quantile on a bell curve, an ankle injury with moderate impact that sits in the 50% quantile on a bell curve and a femur injury with severe impact that sits in the 75% quantile on a bell curve. As can be seen in FIG. 5, the femur injury with severe impact has the highest dollar value and would, therefore, be most likely to result in the potential judgement value. This leads to the potential judgement value being determined by the largest potential dollar value on the bell curve as opposed to a cumulative approach of adding potential damages for each individual injury. The potential judgement value is most likely to be accurate for types of law that have quantum damage values such as personal injury and employment law. Where potential judgements are likely to include more subjective values, the potential judgement value becomes much more challenging to predict and plot on a bell curve.

A total claims value may be calculated using the potential judgement value found on the bell curve. This is done by adding the potential judgement value with an estimated cost for litigation to create a sum total and multiplying the sum total by an interest value to create the total claims value. As an example, a total claims value for a non-pecuniary claim could be calculated as follows:

Step 1: Order the non-pecuniary awards data from smallest to largest.
Step 2: Count how many observations you have in your data set. As an example only, a femur cases set has 40 items.
Step 3: Convert any percentage to a decimal for "q". Choose the number where "q" percent of the values fall below it.
Step 4: Insert values into the formula
ith observation=q(n+1), where the ith observation is at X on the bell curve. The xth number in the set is an award value which is the number where "q" percent of the values fall below it.

The total claims value may be adjusted to a current day value using any calculation or method known in the art. In one embodiment current day value is calculated using the following calculation: (total claims value)/(1+(the periodic rate of return))^(number of periods). The total claims value and the current day value may be useful when creating a litigation strategy or making a potential settlement offer.

It is not always possible to obtain compensation amounts directly from a specific source document and it may be necessary to calculate the compensation amounts from data that is available in the specific source documents, citations and other related documents. It may be necessary to calculate such compensation amounts using various models known to a person skilled in the art may be used to predict compensation. By comparing the performance of various models with different transformations of input features, it may be possible to identify a different model that works best for each cluster in the input dataset. Improved results may be obtained by comparing the performance of the various models to each other. In one embodiment, hypothetical compensation amounts are calculated as follows:

Percentage of keywords in a document=(number of matched keywords in the document)/(number of total keywords in the document)×100;
Attribution of award amount=(percentage of keywords in a document)×total award amount;
Average of attribution of keyword=(the sum of the attribution of award amount for every document having the matching keywords)/(the number of documents having the matching keywords).

By utilizing these calculations, it may be possible to attribute specific award values to specific keywords. It will be understood by a person skilled in the art that different methods of calculating compensation amounts may be used.

Creating probability maps of common occurrences in source documents and corresponding citations can be used to complete an analysis for a potential deviancy related to an uncommon occurrence. Utilizing the present method, in particular the Keyword Score value, it may be possible to assist in determining what additional injuries can be expected, if a potential fraud is occurring and whether or not an unlikely injury claim is being made. Similar source documents are clustered together in graph database and grouped by similarity. The analysis of injury patterns from multiple source documents and corresponding citations can be used to create probability maps based around common injury patterns and clusters. The probability of a specific injury falling outside of the patterns and clusters may be indicative of a potential fraud.

Creating probability maps related to at least one of the keywords can be used to complete an analysis for a potential outcome. As an example, the analysis of source documents and corresponding citations clustered together in graph database can be used to identify injury patterns, treatment plans and the success of the treatment plans. An analysis of the probability maps created may provide insight into what type of treatment plan may be most appropriate given the injuries a person has.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A method for determining relevant search results comprising the steps of:
providing a searchable database containing a plurality of source documents, the source documents having at least one keyword, at least one citation corresponding to each of the source documents;
extracting the at least one keyword from one of the plurality of source documents using a parser, storing the at least one keyword from one of the plurality of source documents in the searchable database in association with the one source document;

extracting at least one keyword from the at least one citation corresponding to the one source document using the parser, storing the at least one keyword from the at least one citation corresponding to one source document in the searchable database in association with each of the at least one citations;

linking the at least one citation corresponding to the one source document in a graph database based upon at least one keyword shared between the one source document and the at least one corresponding citation;

repeating the process of extracting keywords from one of the plurality of source documents, extracting keywords from the at least one corresponding citation of the at least one source documents and linking the at least one corresponding citations to the source document in a graph database based upon the at least one keywords shared between the at least one corresponding citations and the source document until all of the plurality of source documents are linked to at least one corresponding citation to create a web of interaction between the plurality of source document;

an is about score of matching keyword mentions is calculated, the is about score of matching keyword mentions quantifying the number of keywords that are shared between the one source document and the at least one corresponding citation; and a potential judgement value is predicted by plotting a monetary value for a judgement for a set of the most relevant source documents and the at least one corresponding citation on a bell curve, the set of the most relevant source documents being determined by a relevance score.

2. The method of claim 1 wherein the is about score is used to rank the plurality of source documents and the at least one corresponding citations for searching purposes.

3. The method of claim 1 wherein the potential judgement value is determined by a highest weighted value on the bell curve for a judgement found in the set of the most relevant source documents.

4. The method of claim 1 wherein the at least one keyword is a subset of a type of law.

5. The method of claim 1 wherein the at least one keyword includes a specific jurisdiction.

6. The method of claim 1 wherein the at least one keyword includes an identification of a party or parties at fault and to what degree each of the parties are at fault.

7. The method of claim 1 wherein the at least one keyword includes personal injury law.

8. The method of claim 7 wherein the at least one keywords include a severity of the injuries on an injured party, the severity of the injuries being used as a calculated weighting.

9. The method of claim 1 wherein a further step of calculating a total claims value by adding the potential judgement value with an estimated cost for litigation to create a sum total and multiplying the sum total by an interest value to create the total claims value.

10. The method of claim 9 wherein a further step of adjusting the total claims value to a current day value is completed.

11. The method of claim 10 wherein the current day value is determined using the calculation: (total claims value)/(1+ (the periodic rate of return)) ^(number of periods).

12. The method of claim 1 wherein a further step of creating at least one probability map of at least one common occurrence in the plurality of source documents and corresponding citations is completed to analyze for a potential deviancy related to an uncommon occurrence.

13. The method of claim 1 wherein a further step of creating a probability map related to at least one of the keywords is completed to analyze for a potential outcome.

14. The method of claim 1 wherein the at least one corresponding citation is attributed to a specific party providing the corresponding citation when the source document is being parsed.

15. The method of claim 1 wherein a set of document results of a keyword query search are provided to a user based upon a relevance score, the relevance score quantifying a matching between the at least one keywords of the plurality of source documents and the keyword query search, the set of document results of the keyword query search including only source documents where the is about score is greater than zero.

16. The method of claim 15 wherein the relevance score is calculated using the formula ((sum of about score of matching keyword mentions where about score>0)/((sum of about score of matching keyword mentions where about score>0)+(sum of about score of not matching keyword mentions where about score>0)))×(sum of query weight of matching keyword mentions where about score>0).

17. A method for determining relevant search results comprising the steps of:

providing a searchable database containing a plurality of source documents, the source documents having at least one keyword, at least one citation corresponding to each of the source documents;

extracting the at least one keyword from one of the plurality of source documents using a parser, storing the at least one keyword from one of the plurality of source documents in the searchable database in association with the one source document;

extracting at least one keyword from the at least one citation corresponding to the one source document using the parser, storing the at least one keyword from the at least one citation corresponding to one source document in the searchable database in association with each of the at least one citations;

linking the at least one citation corresponding to the one source document in a graph database based upon at least one keyword shared between the one source document and the at least one corresponding citation;

repeating the process of extracting keywords from one of the plurality of source documents, extracting keywords from the at least one corresponding citation of the at least one source documents and linking the at least one corresponding citations to the source document in a graph database based upon the at least one keywords shared between the at least one corresponding citations and the source document until all of the plurality of source documents are linked to at least one corresponding citation to create a web of interaction between the plurality of source document;

a set of document results of a keyword query search are provided to a user based upon a relevance score, the relevance score quantifying a matching between the at least one keywords of the plurality of source documents and the keyword query search, the set of document results of the keyword query search including only source documents where the is about score is greater than zero;

the relevance score being calculated using the formula ((sum of about score of matching keyword mentions where about score>0)/((sum of about score of matching keyword mentions where about score>0)+(sum of about score of not matching keyword mentions where about score>0)))×(sum of query weight of matching keyword mentions where about score>0).   (5)

* * * * *